United States Patent
Tiernan et al.

(10) Patent No.: US 9,109,690 B2
(45) Date of Patent: Aug. 18, 2015

(54) PIVOT PIN WITH INTERNAL OIL PASSAGE

(75) Inventors: Chris David Tiernan, Wixom, MI (US); Tom Suchecki, Sterling Heights, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 588 days.

(21) Appl. No.: 13/282,368

(22) Filed: Oct. 26, 2011

(65) Prior Publication Data

US 2013/0109517 A1    May 2, 2013

(51) Int. Cl.
| | | |
|---|---|---|
| F16H 57/04 | (2010.01) | |
| F16H 57/05 | (2006.01) | |
| F01M 1/08 | (2006.01) | |
| F01M 9/10 | (2006.01) | |
| F02B 67/06 | (2006.01) | |

(52) U.S. Cl.
CPC .................. F16H 57/05 (2013.01); F01M 1/08 (2013.01); F01M 9/10 (2013.01); F16H 57/0471 (2013.01); F16H 57/0489 (2013.01); F02B 67/06 (2013.01)

(58) Field of Classification Search
CPC ................ F16H 2007/0859; F16H 2007/0872; F16H 2007/0806; F16H 2007/0812; F01L 1/02

USPC ............................................................ 474/91
See application file for complete search history.

(56) References Cited

U.S. PATENT DOCUMENTS

| | | | | |
|---|---|---|---|---|
| 4,504,251 A | * | 3/1985 | Mittermeier | 474/110 |
| 5,346,436 A | * | 9/1994 | Hunter et al. | 474/110 |
| 5,647,811 A | * | 7/1997 | Mott | 474/91 |
| 5,720,682 A | * | 2/1998 | Tada | 474/91 |
| 5,743,230 A | * | 4/1998 | Yamazaki et al. | 123/195 H |
| 5,868,638 A | * | 2/1999 | Inoue et al. | 474/110 |
| 6,619,247 B2 | * | 9/2003 | Kobayashi | 123/90.15 |
| 6,863,042 B2 | * | 3/2005 | Oh | 123/196 R |
| 6,871,627 B2 | * | 3/2005 | Fujikubo | 123/196 R |
| 7,121,248 B2 | * | 10/2006 | Fukuda et al. | 123/196 W |
| 7,125,355 B2 | * | 10/2006 | Schmidt et al. | 474/91 |
| 7,685,982 B2 | * | 3/2010 | Inaba et al. | 123/90.31 |
| 7,882,819 B2 | * | 2/2011 | Koyama | 123/196 R |
| 2002/0013189 A1 | * | 1/2002 | Van Der Kamp et al. | 474/91 |
| 2003/0064842 A1 | * | 4/2003 | Konno et al. | 474/111 |
| 2011/0244999 A1 | * | 10/2011 | Nakamura et al. | 474/91 |

* cited by examiner

Primary Examiner — Henry Liu
(74) Attorney, Agent, or Firm — James Dottavio; Alleman Hall McCoy Russell & Tuttle LLP

(57) ABSTRACT

A system for an engine comprising an engine drive system and an oil delivery system is provided. According to one embodiment, the engine drive system includes a chain that engages a plurality of drive sprockets and a chain guide that pivots about a pin. Further, the pin may include an internal oil passage that is in fluidic communication with the oil delivery system. In this way, improved oil lubrication can be provided with simplified structure and manufacturing.

20 Claims, 2 Drawing Sheets

PIVOT PIN WITH INTERNAL OIL PASSAGE

BACKGROUND AND SUMMARY

Vehicles may use a timing belt or chain to drive various components in an internal combustion engine.

For example, U.S. Pat. No. 7,882,819 describes an oil jet member that lubricates a drive chain for a balancing shaft. The system includes a reservoir chamber that supplies oil to a tensioner for distribution to the drive chain, wherein the oil jet member is positioned between the reservoir and the tensioner. The oil jet member is fixed by a bolt and communicates with a bolt bore to distribute oil to the tensioner.

The inventors herein have recognized various issues with the above system. In particular, the bolt bore is exterior to the bolt and thus a housing surrounding the bold must be machined to provide a passage for oil distribution. As such, a separate housing must be machined for each vehicle application.

As such, one example approach to address the above issues is to provide an oil passage that is internal to a pivot pin. In this way, it is possible to deliver oil to an engine drive system, without designing a housing to accommodate each vehicle application. Specifically, the pivot pin may include an internal oil passage with one or more branches that are in fluidic communication with an oil delivery system such that oil is received from the oil delivery system and expelled from the pivot pin to lubricate a component of the engine drive system. Further, by taking advantage of the internal oil passage, the pivot pin may impart additional functionality, which may reduce engine weight by eliminating other features. For example, the pivot pin may enable a chain guide to pivot about the pivot pin to maintain tension in the chain, while providing oil to the chain for lubrication.

Note that the pivot pin with the internal oil passage may be associated with other engine drive system components, and/or other engine components. Further, more than one pivot pin may be included to lubricate components, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a pivot pin for an engine drive system component that includes an internal oil passage. This arrangement allows the pivot pin to engage with a device, to enable pivoting of that device, while lubricating another device. This system allows for a more compact design with a lower weight than traditional designs due to the resulting geometric configuration and combination of features. Various devices may be included in the disclosed system. For example, a chain guide may be mounted to a front or rear end of an engine block via the pivot pin to enable the chain guide to articulate for maintaining tension in a chain, while lubricating the chain by expelling oil from the internal oil passage of the pivot pin. The engine drive system may utilize the pivot pin with the internal oil passage in different ways; for example, by including the pivot pin in various components to lubricate the chain in one or more positions. For example, one or more pivot pins of the present disclosure may be included in the chain guide, a roller, a tensioning device, a tensioning arm, another device of the engine drive system, and/or another component of the engine. Further, an oil deflection device to redirect oil expelled from the pivot pin may be included, if desired.

Figure 1:
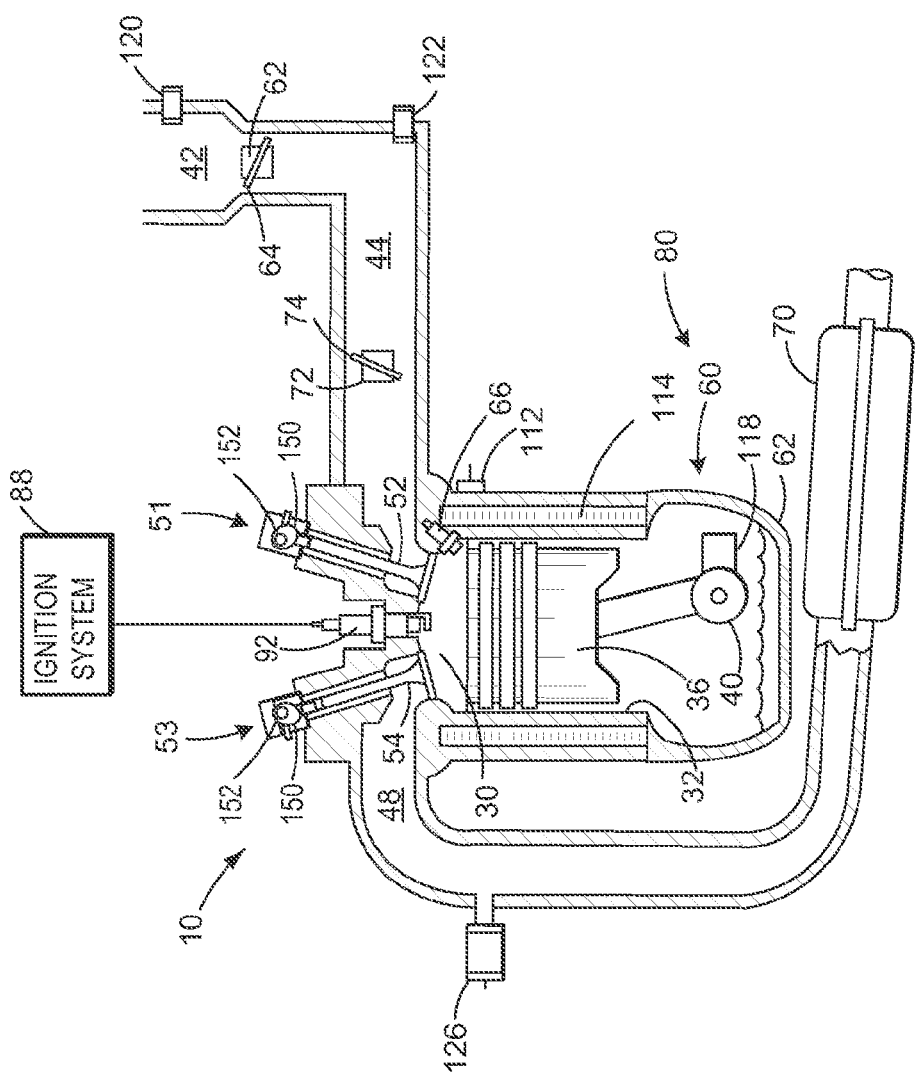
FIG. 1 shows a schematic diagram of an example internal combustion engine.

FIG. 1 is a schematic diagram showing one cylinder of multi-cylinder internal combustion engine 10. Engine 10 may be controlled at least partially by a control system (not shown) and by input from a vehicle operator (not shown), for example.

Combustion cylinder 30 of engine 10 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10. As described in more detail below, crankshaft 40 may be coupled to an engine drive system via a chain, wherein a chain guide, at least part, maintains tension in the chain via a tension adjustment mechanism.

Wet sump crankcase 60 may house crankshaft 40. Further, crankcase 60 may be coupled to oil pan 62. Crankcase 60 may enable lubrication of crankshaft 40 to permit fluidic reciprocating motion. Oil may be suctioned from oil pan 62 by a pickup tube and delivered to an oil pump (not shown) in order to lubricate an engine drive system, for example. Oil may be transported via an oil delivery passage (not shown) to lubricate various components such as crankshaft 40, camshafts 152, a timing chain/belt that drives crankshaft 40 and camshafts 152, etc. For example, a chain of an engine drive system may be lubricated by a chain guide pivot pin with an internal oil passage. Such an example will be described in greater detail with reference to FIGS. 2-4. Further, oil may return to oil pan 62 via an oil return passage, an oil collection device, and/or via gravity. In this way, oil may be cycled through engine 10 such that rotating components are effectively lubricated to enable the four stroke combustion cycle.

Combustion cylinder 30 may receive intake air from intake manifold 44 via intake passage 42 and may exhaust combustion gases via exhaust passage 48. Intake manifold 44 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In this example, intake valve 52 and exhaust valve 54 may be controlled by cam actuation via respective cam actuation systems 51 and 53. As described in more detail below, cam actuation systems 51 and 53 may be coupled to a drive system via a chain, wherein a chain guide, at least part, maintains tension in the chain via a tension adjustment mechanism.

Cam actuation systems 51 and 53 may each include one or more cams 150 driven by a camshaft 152 and may utilize one or more of cam profile switching (CPS), variable cam timing (VCT), variable valve timing (VVT) and/or variable valve lift (VVL) systems that may be operated by a controller to vary valve operation.

Fuel injector 66 is shown coupled directly to combustion cylinder 30 for injecting fuel directly therein in proportion to a pulse width signal received from a controller via an electronic driver, for example. In this manner, fuel injector 66 provides what is known as direct injection of fuel into combustion cylinder 30. The fuel injector may be mounted on the side of the combustion cylinder or in the top of the combustion cylinder, for example. Fuel may be delivered to fuel injector 66 by a fuel delivery system (not shown) including a fuel tank, a fuel pump, and a fuel rail. In some embodiments, combustion cylinder 30 may alternatively or additionally include a fuel injector arranged in intake passage 42 in a configuration that provides what is known as port injection of fuel into the intake port upstream of combustion cylinder 30.

Intake passage 42 may include a throttle 62 having a throttle plate 64 configured for electronic throttle control (ETC), which is provided as one non-limiting example. In this manner, throttle 62 may be operated to vary the intake air provided to combustion cylinder 30 among other engine combustion cylinders. Intake passage 42 may also include a charge motion control valve (CMCV) 74, a CMCV plate 72, a mass air flow sensor 120 and a manifold air pressure sensor 122, for example.

Ignition system 88 provides an ignition spark to combustion chamber 30 via spark plug 92 in response to a controller. Exhaust gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The exhaust system may include light-off catalysts and underbody catalysts, as well as exhaust manifold, upstream and/or downstream air-fuel ratio sensors. Catalytic converter 70 can include multiple catalyst bricks, in one example. In another example, multiple emission control devices, each with multiple bricks, can be used. Catalytic converter 70 can be a three-way type catalyst in one example.

As described above, FIG. 1 shows only one cylinder of a multi-cylinder engine, and each cylinder may similarly include its own set of intake/exhaust valves, fuel injector, ignition system, etc. During operation, the multi-cylinder engine may undergo a four stroke cycle wherein the actuation of the crankshaft and camshafts are synchronized by an engine drive system, as described below. Further, the engine drive system may include various other accessory drives coupled to the engine drive system via one or more chains, belts, bands, etc. For example, an oil pump, balance shaft, fan, etc. may be driven by the disclosed engine drive system.

Figure 2:
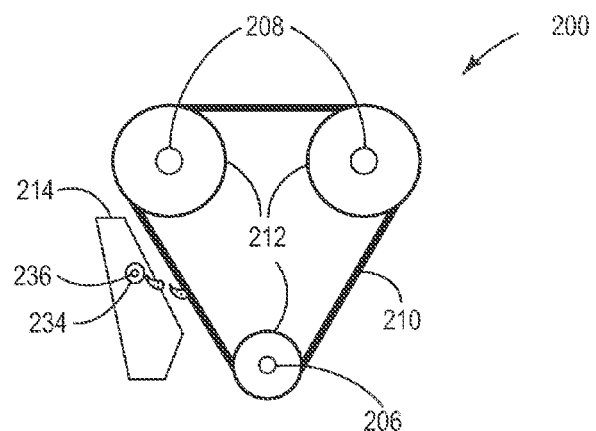
FIG. 2 shows a schematic diagram of an engine drive system according to an embodiment of the present disclosure.

FIG. 2 illustrates an example engine drive system 200 that may be included in engine 10 according to an embodiment of the present disclosure. As shown, engine drive system 200 may include crankshaft 206 coupled to camshafts 208 via chain 210. Chain 210 may engage various drive sprockets 212 associated with crankshaft 206 and camshafts 208. Further, engine drive system 200 may include chain guide 214 to maintain tension in chain 210. The chain guide may comprise various materials, such as plastic, for example.

Chain guide 214 may include pivot pin 234 for attaching chain guide 214 to an engine block, for example. Further, pivot pin 234 may enable chain guide 214 to pivot about an axis of pivot pin 234 to adjust a position and/or orientation of chain guide 214 with respect to chain 210. In this way, chain guide 214 may move/rotate to maintain tension in chain 210.

Pivot pin 234 may further include an internal oil passage 236 for lubricating chain 210. For example, oil may squirt from an orifice of pivot pin 234 in communication with oil passage 236. In this way, pivot pin 234 may enable chain guide 214 to maintain tension in chain 210 while maintaining sufficient lubrication of chain 210. Pivot pin 234 may be a press in dowel, a threaded pin, or another pin. Examples of pivot pins including internal oil passages are described in further detail below with respect to FIGS. 3 and 4.

It will be appreciated that engine drive system 200 is provided by way of example and thus is not meant to be limiting. Therefore, engine drive system 200 may include additional and/or alternative components than those included in the illustrative embodiment. For example, engine drive system 200 may optionally include an accessory drive. As such, engine drive system 200 may additionally or alternatively include an oil pump, a balance shaft, a fan, etc that may be driven by chain 210. Further, engine drive system 200 may be coupled to another drive system, wherein the two drive systems may include a common drive shaft and each system includes a separate chain that engages the common drive shaft, for example. Therefore, it will be appreciated that the engine drive system may include more than one chain, belt, etc. to drive the various components of engine 10 without departing from the scope of this disclosure.

Figure 3:
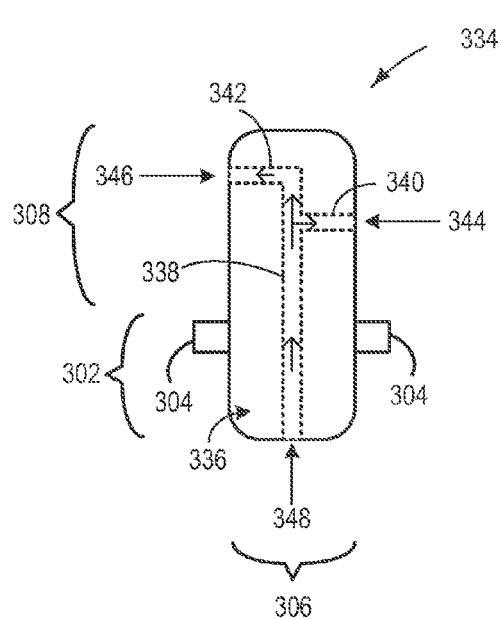
FIG. 3 shows a schematic diagram of an example pivot pin that may be included in the engine drive system of FIG. 2 according to an embodiment of the present disclosure.

FIG. 3 shows an example pivot pin 334 that may be included in the engine drive system 200 of FIG. 2, for example. In the illustrative embodiment, pivot pin 334 may be a press in dowel, for example.

Pivot pin 334 may be at least partially contained within a chain guide, a tensioning device, a tensioning arm, a roller, or another device associated with an engine drive system. For example, a region 302 of pivot pin 334 may be contained within one of the aforementioned devices. As shown, flanges 304 may be included within region 302 to reduce pin walk out. In other words, flanges 304 may retain pivot pin 334 within the chain guide, for example. It will be appreciated that flanges 304 are provided as one non-limiting example of reducing pin walk out and other methods are possible without departing from the scope of this disclosure. Further, it will be appreciated that pivot pin 334 may include one or more additional flanges to securely retain chain guide on pivot pin 334 while maintaining pivoting freedom. Such flanges may be placed interior and/or exterior to the chain guide when the chain guide is engaged with the pivot pin, for example.

Further, pivot pin 334 may be coupled to an engine block for securing the chain guide to the engine block. However, while the chain guide may be secured to the engine block, it will be appreciated that the chain guide may be free to rotate/move, as described above. As shown, a region 306 of pivot pin 334 may be coupled to the engine block, for example. Region 306 may include any suitable feature for coupling pivot pin 334 to the engine block. For example, region 306 may include one or more flanges, similar to flanges 304. Further still, pivot pin 334 may be in fluidic communication with an oil delivery system, such as oil delivery system 80 of FIG. 1, for example. As such, the oil delivery system may feed oil to pivot pin 334 within region 306, for example.

Further, pivot pin 334 may include a region 308 that extends from a surface of the chain guide. Thus, region 308 may be open to the atmosphere, for example. As such, region 308 may be an area associated with expelling oil to surrounding components such as the engine drive system chain, for example.

Pivot pin 334 may include an internal oil passage 336 that is in fluidic communication with the oil delivery system. Internal oil passage 336 may be a void within an interior of pivot pin 334. For example, pivot pin 334 may be drilled, or otherwise cut, to create internal oil passage 336. As one example, a center of pivot pin 334 may be drilled out to create a center drilled region; however, it will be appreciated that the pivot pin may be drilled off-center, if desired. Further, pivot pin 334 may be drilled laterally to interest with the center drilled region, for example. One or more lateral cuts may intersect the center drilled region at any suitable angle. As one example, one or more lateral drill cuts may intersect the center drilled region at a 90° angle; however, it will be appreciated that other angles are possible. In this way, a flow path internal to pivot pin 334 may be created such that pivot pin 334 may be in fluid communication with the oil delivery system.

For example, internal oil passage 336 may include one or more branches, as shown. In the illustrated embodiment, oil passage 336 includes a main passage 338, a first branch 340, and a second branch 342. As such, main passage 338 may be the center drill region and first and second branches may be the result of lateral drill cuts, for example. It will be appreciated that oil passage 336 may include any suitable number of passages/branches without departing from the scope of this disclosure. Further, oil passage 336 may have any suitable geometry without departing from the scope of this disclosure. In general, oil passage 336 is a conduit for oil flow, thus, oil passage 336 may be drilled to suit one or more oil viscosity grades and/or to meet the specifications of the oil delivery system. Further, it will be appreciated that internal oil passage 336 may have any suitable diameter to enable oil flow. For example, internal oil passage 336 may have a constant diameter, wherein the diameter is similar for each branch of the oil passage. As another example, the diameter of internal oil passage 336 may vary, and thus some branches may have a different diameter than other branches.

As shown, main passage 338 may span at least a portion of regions 302, 304, and 306. In this way, main passage 338 may be in fluid communication with the oil delivery system, the first branch, and the second branch, for example. Thus, main passage 338 may receive oil from oil delivery system and may provide a conduit for oil flow to first branch 340 and second branch 342.

As shown, first and second branches may be positioned within region 308. Thus, first and second branches may be a final passage for oil prior to oil squirting from pivot pin 334. In other words, first and second branches may be a conduit for oil flow such that oil may be expelled from pivot pin 334. It will be appreciated that oil may squirt, or be otherwise released from pivot pin 334, due to a pressure force from an oil pump or another device associated with the oil delivery system, for example. As another example, oil may be released from pivot pin 334 due to gravity.

Further, pivot pin 334 may include at least one orifice coinciding with oil passage 336. For example, FIG. 3 shows a feeder orifice 348 that may coincide with main passage 338 for fluidically communicating with an oil delivery system, such as oil delivery system 80. Therefore, feeder orifice 348 may receive oil from oil delivery system 80. Further, feeder orifice 348 may be in fluidic communication with the oil delivery system at an interface between pivot pin 334 and the engine block, for example. Further, pivot pin 334 may include a first orifice 344 coinciding with first branch 340 and a second orifice 346 coinciding with second branch 342. First and second orifices may enable oil to squirt from said orifices to lubricate a chain, such as chain 210 of FIG. 2, for example. In this way, pivot pin 334 may receive oil from the oil delivery system, provide a conduit for oil flow, and may expel oil to surrounding devices for lubricating such devices.

It will be appreciated that the example pivot pin of FIG. 3 is provided by way of example and thus is not meant to be limiting. As such, pivot pin 334 may include additional and/or alternative features and those illustrated in FIG. 3. As one example, pivot pin may engage with the chain guide and/or the engine block differently.

Figure 4:
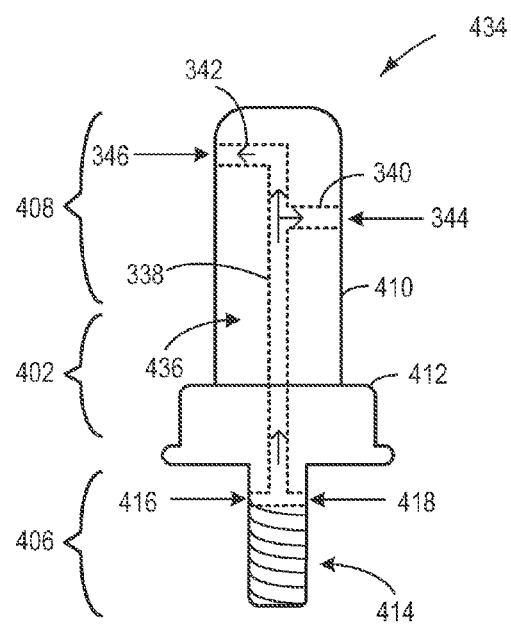
FIG. 4 shows a schematic diagram of another example pivot pin that may be included in the engine drive system of FIG. 2 according to an embodiment of the present disclosure.

For example, FIG. 4 shows an example pivot pin 434 that may be included in the engine drive system 200 of FIG. 2, for example. As shown, pivot pin 434 may be a threaded pin. It is to be understood that pivot pin 434 may include similar features as pivot pin 334, and thus, such features will be discussed briefly.

As shown, pivot pin 434 may be at least partially contained within a chain guide, a tensioning device, a tensioning arm, a roller, or another device associated with an engine drive system. For example, a region 402 of pivot pin 434 may be contained within one of the aforementioned devices. Region 402 may include a main body portion 410 and/or a hex portion 412, for example. Thus, the chain guide may be coupled to main body portion 410 and/or hex portion 412. It will be appreciated that the chain guide may be retained on pivot pin 434 in any suitable way. For example, the chain guide may be retained due to frictional forces between pivot pin 434 and the chain guide. As another example, one or more flanges may be included to securely attach chain guide to pivot pin while maintaining pivoting freedom.

Further, pivot pin 434 may be coupled to an engine block for securing the chain guide to the engine block. However, while the chain guide may be secured to the engine block, it will be appreciated that the chain guide may be free to rotate/move, as described above. As shown, a region 406 of pivot pin 434 may be coupled to the engine block, for example. Region 406 may include any suitable feature for coupling pivot pin 434 to the engine block. As shown, region 406 may include a threaded portion 414 for threadedly engaging pivot pin 434 with the engine block. Further still, pivot pin 434 may be in fluidic communication with an oil delivery system, such as oil delivery system 80 of FIG. 1, for example. As such, the oil delivery system may feed oil to pivot pin 434 within region 406, for example.

Further, pivot pin 434 may include a region 408 that extends from a surface of the chain guide. Thus, region 408 may be open to the atmosphere, for example. As such, region 408 may be an area associated with expelling oil to surrounding components such as the engine drive system chain, similar to pivot pin 334.

Pivot pin 434 may include an internal oil passage 436 that is in fluidic communication with the oil delivery system. Internal oil passage 436 may be a void within an interior of pivot pin 434 and thus may provide an internal conduit for oil flow. It will be appreciated that internal oil passage 436 may be similar to internal oil passage 336, and as such, may include similar features. Such features are referenced with like numbers and will not be discussed repeatedly for the sake of brevity. However, internal oil passage 436 may differ to some degree.

For example, internal oil passage 436 may include one or more feeder branches, as shown. In the illustrated embodiment, oil passage 436 includes a first feeder branch 416 and a second feeder branch 418. First and second feeder branches may be included within region 406, for example. Therefore, first and second feeder branches may be in fluidic communication with the oil delivery system at an interface between pivot pin 434 and the engine block, for example. As shown, first and second feeder branches may be positioned with region 406 but outside of threaded region 414. However, in some embodiments, first and second feeder branches may be included with threaded region 414. It will be appreciated that any number of feeder branches may be included, and thus, pivot pin 434 is not limited to the two feeder branches as illustrated in FIG. 4. Any suitable number of feeder branches is possible without departing from the scope of this disclosure.

Further, pivot pin 434 may include at least one orifice coinciding with oil passage 436. For example, pivot pin 434 may include a feeder orifice coinciding with each feeder branch for fluidically communicating with the oil delivery system, similar to the above description for pivot pin 334. Further, pivot pin 434 may include a first orifice 344 coinciding with first branch 340 and a second orifice 346 coinciding with second branch 342, similar to the above description for pivot pin 334. First and second orifices may enable oil to squirt from said orifices to lubricate a chain, such as chain 210 of FIG. 2, for example. In this way, pivot pin 434 may receive oil from the oil delivery system, provide a conduit for oil flow, and may expel oil to surrounding devices for lubricating such devices.

It will be appreciated that the example pivot pin of FIG. 4 is provided by way of example and thus is not meant to be limiting. As such, pivot pin 434 may include additional and/or alternative features and those illustrated in FIG. 4 without departing from this disclosure.

It will be appreciated that the example pivot pins provided herein enable a device, such as chain guide 214, to articulate, and further, provide oil to a component, such as chain 210. Therefore, the example pivot pins of the present disclosure may have dual functionality. By combining pivoting and oil delivery, the example pivot pins of the present disclosure allows for a more compact engine design, and thus may reduce engine weight.

It will be appreciated that the engine drive system may utilize the pivot pin with the internal oil passage in different ways; for example, by including the pivot pin in various components to lubricate the chain in one or more positions. For example, one or more pivot pins of the present disclosure may be included in the chain guide, a roller, a tensioning device, a tensioning arm, another device of the engine drive system, and/or another component of the engine. Further, an oil deflection device to redirect oil expelled from the pivot pin may be included, if desired.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising:
   an engine drive system including a chain that engages a plurality of drive sprockets and a chain guide that pivots about a pin having a first region and a threaded region, the pin including an internal oil passage;
   the chain guide coupled to the first region of the pin;
   the first region of the pin comprising a main body portion and a hex portion;
   the hex portion further comprising one or more flanges;
   the main body region including a second region outside the chain guide and exposed to atmosphere;
   the second region having one or more orifices in fluidic communication with the internal oil passage to expel oil; and
   an oil delivery system in fluidic communication with the internal oil passage.

2. The system of claim 1, wherein the pin enables the chain guide to maintain tension in the chain, and the pin expels oil to lubricate the chain.

3. The system of claim 1, wherein the pin further includes an orifice for receiving oil from the oil delivery system and one or more orifices for expelling oil to the chain.

4. The system of claim 1, wherein the internal oil passage includes one or more branches, providing one or more conduits for oil to flow.

5. The system of claim 1, wherein the pin includes a region that is exterior to the chain guide and exposed to atmosphere.

6. The system of claim 5, wherein the region includes one or more orifices in communication with the internal oil passage for expelling oil to the chain.

7. The system of claim 1, wherein the pin includes a region contained within the chain guide.

8. The system of claim 1, wherein the pin includes a region coupled to an engine block.

9. The system of claim 1, wherein the pin is a pivot pin.

10. An engine drive system, comprising:
    a plurality of drive shafts;
    a drive sprocket coupled to each of the plurality of drive shafts;
    a chain that engages each drive sprocket;
    a chain guide that engages the chain; and
    a pivot pin comprising a first region and a threaded region including an internal oil passage, a feeder orifice and a release orifice, the pivot pin pivotably coupled to the chain guide at the first region, the first region further comprising a hex portion and a main body portion where at least part of the main body portion is exposed to atmosphere, the release orifice positioned in the exposed part of the main body portion.

11. The system of claim 10, wherein the internal oil passage is in fluidic communication with an oil delivery system, wherein the feeder orifice receives oil from the oil delivery system and the release orifice releases oil to the chain.

12. The system of claim 10, wherein a center of the pivot pin is drilled to create the internal oil passage, and wherein the plurality of drive shafts include each of a crankshaft, a first camshaft, and a second camshaft.

13. The system of claim 12, wherein the pivot pin is drilled at one or more locations lateral to the center to create one or more branches of the internal oil passage.

14. A pin for an engine, comprising:
    an engine block region that engages with an engine block;
    a device region that engages a drive system device comprising a main body portion and a hex portion;

an exposed region that communicates with atmosphere;
a threaded region; and
an internal oil passage that spans the engine block region, the device region and the exposed region, further comprising at least one orifice positioned within the exposed region.

15. The pin of claim 14, wherein the drive system device is one of a chain guide, a tensioner, and a roller.

16. The pin of claim 14, wherein the internal oil passage includes a main passage, a first branch, and a second branch.

17. The pin of claim 16, wherein the first and second branches are in fluidic communication with the main passage and with the at least one orifice.

18. The pin of claim 17, wherein the first and second branches are positioned within the exposed region, and the main passage spans the engine block region, the device region and the exposed region.

19. The pin of claim 18, wherein the main passage includes one or more feeder branches within the engine block region, the one or more feeder branches in fluidic communication with an oil delivery system.

20. The pin of claim 18, wherein the hex portion further comprises one or more flanges.

\* \* \* \* \*